Patented June 27, 1939

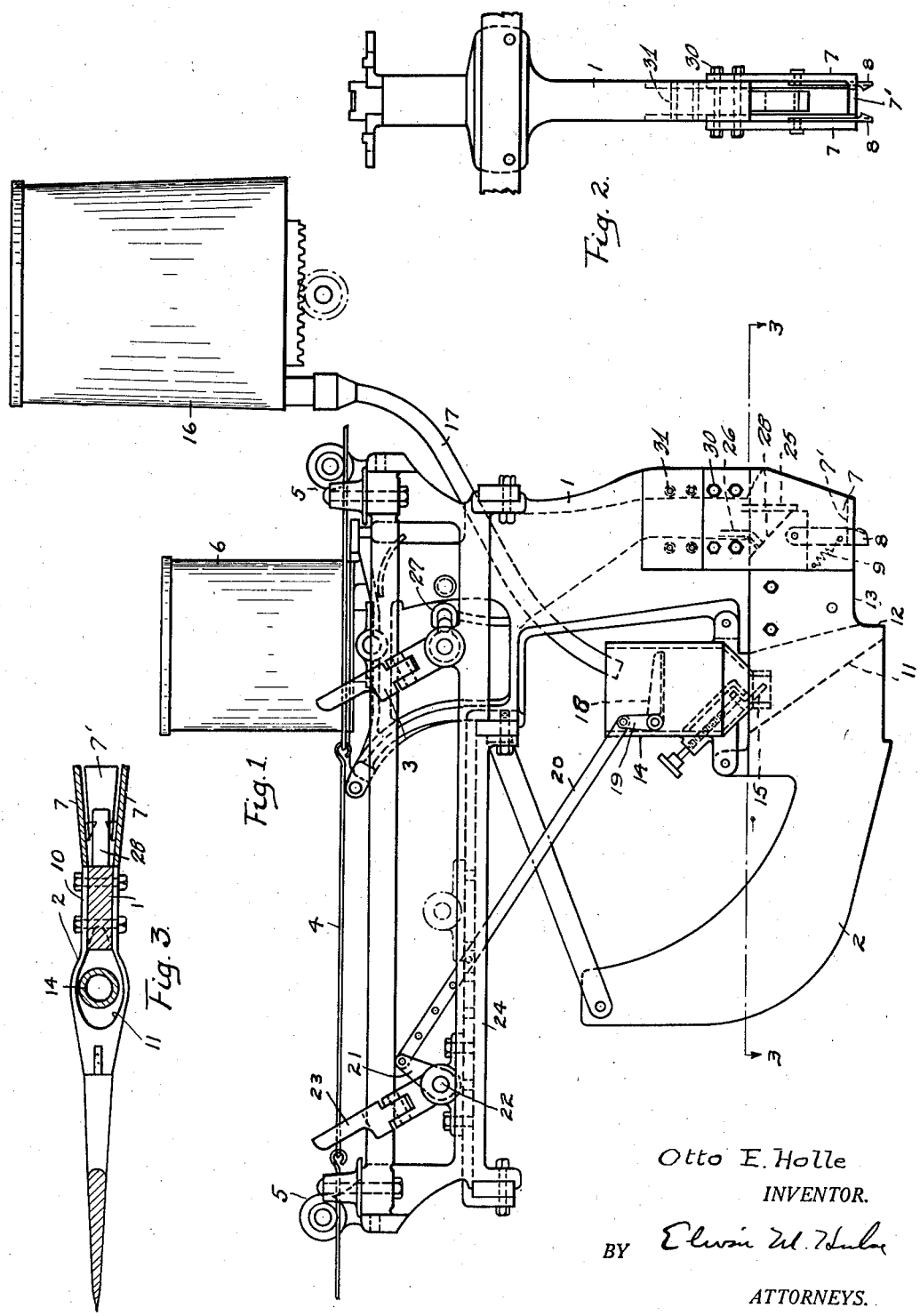
June 27, 1939.  O. E. HOLLE  2,164,066
PLANTER SHOE
Filed Nov. 1, 1937
Otto E. Holle
INVENTOR.
ATTORNEYS.

2,164,066

UNITED STATES PATENT OFFICE 2,164,066

PLANTER SHOE

Otto E. Holle, Decatur, Ind.

Application November 1, 1937, Serial No. 172,067

3 Claims. (Cl. 111—73)

The invention relates to planters and particularly to the shoes therefor.

Heretofore, in planting seed, especially corn, it is desirable to deposit fertilizer along with the seed. In all such planters with which I am familiar, the seed is dropped first and the fertilizer is deposited over or at the side of the seed.

Since the plant food of the fertilizer is dormant while the material is dry and becomes active only by contact with moisture, it is clear that where the fertilizer is deposited above or at the side of the seed it awaits rain to leach it to the seed. If rainfall is delayed the young seed roots are deprived of the benefit of the fertilizer for initial growth.

Where the fertilizer is deposited below the seed there is greater possibility of the presence of sufficient moisture to dissolve the material so that the seed roots grow downwardly into and take up the plant food, thereby giving the young plant the desired early start and since the chemical action of fertilizer is detrimental to the seed germs where the material contacts the seed, I avoid such contact by providing means by which the fertilizer is slightly covered with soil prior to the deposit of the seed.

The object of my invention is to provide a planter shoe with means by which fertilizer may be deposited below the seed whether the seed is planted in hills or continuously drilled.

Another object is to provide a shoe with means by which fertilizer may be deposited in regulated amounts continuously or in hills or for a regulated distance on each side of a hill.

Other objects and advantages will appear hereinafter.

The invention is illustrated in the accompanying drawing in which

Figure 1 is a side elevation of a device embodying the invention.

Fig. 2 is an end elevation of the same and Fig. 3 is a cross-section on line 3—3 of Fig. 1.

Referring to the illustrative drawing 1 represents the shank of a planter to which the single shoe 2 is attached. The shank contains the usual controlling valve 25 and plunger 26 and their usual operating mechanism 27 that are controlled by the trip lever 3 which is actuated by the wire 4 adapted to be stretched across the field being planted and passing through the guides 5. The seed is contained in the receptacle 6 and descends in regulated quantities through the shank 1 onto the ledge 28 therein between the valve 25 and the plunger 26 and upon which it is retained by the valve 25 and released thereby when the trip 3 is actuated. The seed feed mechanism described is well known and commonly in use.

Two outwardly flaring plates 7 connected at their lower ends by a plate 7¹, are adjustably mounted on the lower end of the shank and at opposite sides thereof and depend therefrom, and the deflecting fingers 8 are pivotally mounted on the inner side of the plates respectively and each extends through a slot in the bottom closure 7¹, the springs 9 opposing rearward movement of the fingers. The fingers normally project below the lower ends of the plates 7 and the projecting ends are twisted rearwardly inwardly so as to deflect the soil inwardly as the fingers are moved through the same. The seed descends between the plates and rearwardly of the fingers.

The shoe 2 is of special design. The forward portion is curved upwardly and its rear portion is bifurcated, the ends of the bifurcations 10 being secured to opposite sides of the shank. Adjacent to the forward edge of the shank a tapering and downwardly inclined passageway 11 is formed in the shoe which opens to the exterior preferably at the shoulder 12 formed by the notch 13 in the rear ends of the bifurcations 10.

A hopper 14 is mounted at the upper end of the passageway 11 with its lower end extending down into the passageway. An inclined slide 15 is adjustably mounted adjacent to the discharge end of the hopper by which to control the rate of flow of the fertilizer descending from the hopper. A container 16 for fertilizer is suitably mounted on the machine above the hopper and a conduit 17 connects the container to the hopper. A valve 18 is pivotally disposed in the hopper and a crank 19 is fixed to the valve. A link 20 is pivotally connected to the crank 19 and to a crank 21 secured to a shaft 22. A trip lever 23 is secured to the shaft 22 and is adapted to be operated by the wire 4 similarly to the trip lever 3. The shaft 22 is supported in bearings that are adjustably mounted on a frame 24 that extends forwardly from the shank. The link 20 is adjustably connected to the crank 19 to accommodate any adjustment of the shaft 22.

It is noted that the fertilizer discharge passageway is forward of and below the point of discharge of the seed and that the trip lever for controlling the feed of the fertilizer is forward of the trip lever for the seed. Hence, as the planter moves forwardly and the shoe 2 cuts a furrow in the soil the fertilizer trip lever 23 is actuated to release the material so that it drops into the furrow, the notches 13 permitting the soil to fall inwardly and cover the fertilizer before the seed is released by the operation of the trip lever 3 and descends onto the soil covering the fertilizer. The fingers 8 assure that the soil covers the fertilizer. The side plates 7 are vertically adjustable on the shank and secured thereto by the bolts 30 which are inserted through any of the holes 31 in the shank. The plates having the connecting bottom control the quantity of soil which will fall by gravity into the furrow behind the single shoe and cover the fertilizer prior to the deposit of the seed and hence they also control the depth the seed shall be planted, since the higher the plates are elevated the greater is the clearance below the bottom thereof and the greater will be the amount of soil that will fall into the furrow.

By adjusting the position of the trip lever 23 the fertilizer may be distributed through a selected distance ahead of and behind the point where the seed is dropped, the slide 15 being adjusted to permit the flow of the fertilizer for distribution throughout said distance.

Where the planting is continuous as opposed to hill planting the trip fork 23 is placed in inoperative position and the controlling valve 18 is held open so that there is a continuous flow of fertilizer in such amount as the slide 15 is adjusted to permit.

The invention may be applied to various forms of planters and drills for the various kinds of seed.

What I claim is:

1. In a planter the combination with a seed receptacle and a fertilizer receptacle, of a support having a passageway communicating with the seed receptacle for distributing said seed, a single shoe mounted on the support and having a downwardly inclined passageway extending through it, a hopper communicating at its lower end with said inclined passageway and also having communication with the fertilizer receptacle, the discharge end of the latter passageway being forward of and below the discharge end of the seed passageway, and a pair of plates vertically adjustably attached to opposite sides of the shank rearwardly of the shoe and having a transverse member connecting their lower ends whereby to regulate the gravital descent of the soil into the furrow and over the fertilizer prior to the deposit of the seed.

2. A planter and fertilizer distributer comprising a single shoe having a tapered passageway for fertilizer extending downwardly through it, a support for said member having a downwardly extending passageway for seed, the discharge end of the fertilizer passageway being forwardly of the discharge end of the seed passageway, a pair of vertically adjustable plates on opposite sides of the discharge end of the seed passageway having a longitudinally slotted member connecting their lower ends and a deflector pivotally mounted on each of the plates, the plates with the slotted member thereon being adapted to control the depth of deposit of soil on the fertilizer prior to the deposit of the seed.

3. A planter shoe comprising a shank having a passageway for seed, a single furrow opening member projecting forwardly from and secured to the lower end of the shank, and having a passageway for fertilizer terminating at the lower rear corner of the shoe, two plates vertically adjustably secured to the opposite sides of the shank, rearwardly of the shoe, a longitudinally slotted horizontal member spanning the lower ends of the plates and soil deflectors pivotally mounted on the plates respectively and extending through the slots.

OTTO E. HOLLE.